US008310913B2

(12) United States Patent
Umezawa et al.

(10) Patent No.: US 8,310,913 B2
(45) Date of Patent: Nov. 13, 2012

(54) OPTICAL RECORDING MEDIUM CAPABLE OF USING WIDE RANGES OF LINEAR VELOCITY RECORDING

(75) Inventors: Kazuyo Umezawa, Yokohama (JP); Seiji Morita, Yokohama (JP); Koji Takazawa, Tokyo (JP); Naomasa Nakamura, Yokohama (JP); Naoki Morishita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 441 days.

(21) Appl. No.: 12/237,966

(22) Filed: Sep. 25, 2008

(65) Prior Publication Data

US 2009/0092035 A1 Apr. 9, 2009

(30) Foreign Application Priority Data

Sep. 26, 2007 (JP) ................................. 2007-249664

(51) Int. Cl.
*G11B 7/24* (2006.01)

(52) U.S. Cl. ................. 369/275.4; 369/59.11; 369/47.5; 369/116

(58) Field of Classification Search ............... 369/275.2, 369/275.3, 275.4, 275.1, 287, 288; 428/64.1, 428/64.2, 64.4; 430/321, 320, 270.13, 270.11, 430/270.1

See application file for complete search history.

(56) References Cited

U.S. PATENT DOCUMENTS

| | | | | |
|---|---|---|---|---|
| 5,776,575 | A * | 7/1998 | Hiraoka et al. | 428/64.1 |
| 5,848,043 | A * | 12/1998 | Takada et al. | 369/53.3 |
| 5,939,163 | A | 8/1999 | Ueno et al. | |
| 6,388,978 | B1 * | 5/2002 | Ogawa et al. | 369/116 |
| 7,106,680 | B2 * | 9/2006 | Kato et al. | 369/59.11 |
| 7,158,462 | B2 * | 1/2007 | Ogawa | 369/59.23 |
| 7,345,984 | B2 * | 3/2008 | Watabe et al. | 369/275.2 |
| 7,903,519 | B2 * | 3/2011 | Etoh et al. | 369/59.11 |
| 2003/0031854 | A1 | 2/2003 | Kajander et al. | |
| 2003/0227850 | A1 * | 12/2003 | Kato et al. | 369/59.11 |
| 2004/0037203 | A1 * | 2/2004 | Harigaya et al. | 369/100 |
| 2005/0219995 | A1 * | 10/2005 | Morita et al. | 369/275.4 |
| 2005/0219996 | A1 * | 10/2005 | Morita et al. | 369/275.4 |

(Continued)

FOREIGN PATENT DOCUMENTS

EP 1 566 800 A1 8/2005

(Continued)

OTHER PUBLICATIONS

Search Report mailed Jul. 18, 2011, in Great Britain Patent Application No. GB0817523 filed Sep. 24, 2008.

(Continued)

*Primary Examiner* — Tan X Dinh
(74) *Attorney, Agent, or Firm* — Oblon, Spivak, McClelland, Maier & Neustadt, L.L.P.

(57) ABSTRACT

An information recording medium having a disc shape and a recording layer configured to store information by light, the information being configured to be recorded on the recording layer with a mark and a space, wherein a channel clock period, represented by T, is provided for recording the mark on the recording layer. A mark corresponding to 2T or more can be recorded, and write parameter information is recorded on a particular area of the information recording medium. The parameter information includes a first peak power value used for a standard recording speed, and a second peak power value used for an increased recording speed which is a quadruple of the standard recording speed, the second peak power value being greater than the first peak power value.

5 Claims, 7 Drawing Sheets

U.S. PATENT DOCUMENTS

| | | | | |
|---|---|---|---|---|
| 2005/0219997 | A1 | 10/2005 | Morita et al. | |
| 2005/0226135 | A1 | 10/2005 | Morita et al. | |
| 2006/0140097 | A1 | 6/2006 | Tasaka et al. | |
| 2006/0188817 | A1* | 8/2006 | Morita et al. | 430/270.16 |
| 2006/0250917 | A1* | 11/2006 | Tieke et al. | 369/59.11 |
| 2007/0105049 | A1 | 5/2007 | Lee et al. | |
| 2007/0153653 | A1 | 7/2007 | Kim et al. | |
| 2007/0230306 | A1* | 10/2007 | Sasaki et al. | 369/59.11 |
| 2007/0280092 | A1* | 12/2007 | Takazawa et al. | 369/275.1 |
| 2007/0280093 | A1* | 12/2007 | Takazawa et al. | 369/275.2 |
| 2007/0281123 | A1* | 12/2007 | Umezawa et al. | 428/64.4 |
| 2008/0019261 | A1* | 1/2008 | Nakai et al. | 369/275.4 |
| 2009/0154315 | A1* | 6/2009 | Miyashita et al. | 369/47.5 |
| 2010/0309773 | A1* | 12/2010 | Kobayashi et al. | 369/275.2 |
| 2011/0085434 | A1* | 4/2011 | Umezawa et al. | 369/116 |
| 2011/0107134 | A1* | 5/2011 | Ito et al. | 713/600 |

FOREIGN PATENT DOCUMENTS

| | | | |
|---|---|---|---|
| EP | 1 669 985 | | 6/2006 |
| EP | 1 708 178 | A1 | 10/2006 |
| EP | 1 763 031 | A2 | 3/2007 |
| EP | 1 770 691 | A2 | 4/2007 |
| EP | 1 770 691 | A3 | 4/2007 |
| EP | 1 992 667 | A1 | 11/2008 |
| EP | 1 811 509 | | 5/2010 |
| EP | 2 339 578 | | 6/2011 |
| JP | 8-96404 | | 4/1996 |
| JP | 2004-310843 | | 11/2004 |
| JP | 2005-100577 | | 4/2005 |
| JP | 2005-271587 | | 10/2005 |
| JP | 2006-134518 | | 5/2006 |
| JP | 2006-172529 | | 6/2006 |
| JP | 2006-248180 | | 9/2006 |
| JP | 2007-26541 | | 2/2007 |
| JP | 2007-213782 | | 8/2007 |
| JP | 2007-242199 | | 9/2007 |
| WO | WO 2005/027103 | A1 | 3/2005 |
| WO | WO 2005/096277 | A1 | 10/2005 |
| WO | WO 2006/090892 | A1 | 8/2006 |
| WO | WO 2007/073089 | A1 | 6/2007 |
| WO | WO 2007/105336 | | 9/2007 |
| WO | WO 2008/138812 | A2 | 11/2008 |

OTHER PUBLICATIONS

Office Action mailed Apr. 26, 2011, in Japan Patent Application No. 2007-249664, filed Sep. 26, 2007.

* cited by examiner

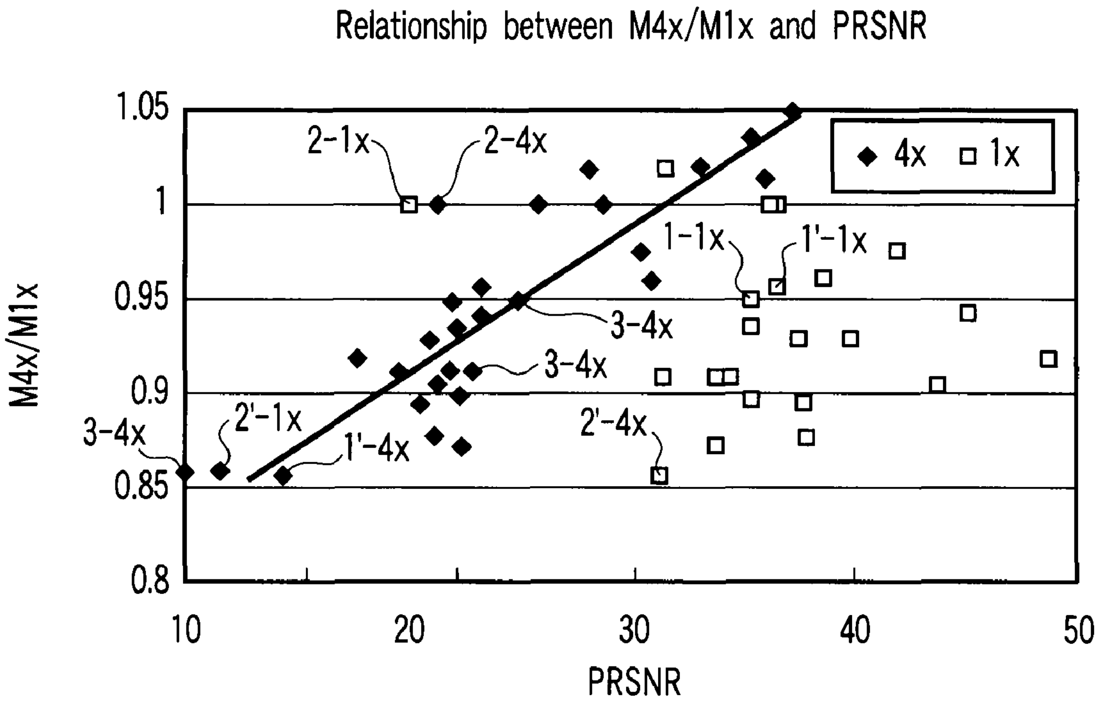
F I G. 1

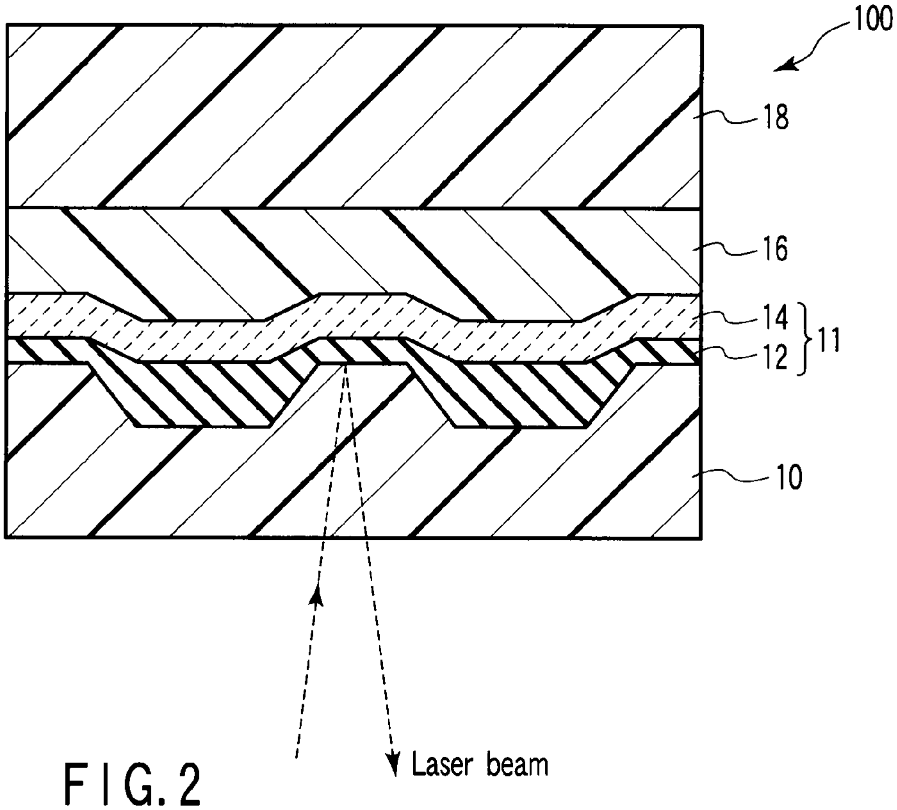
F I G. 2
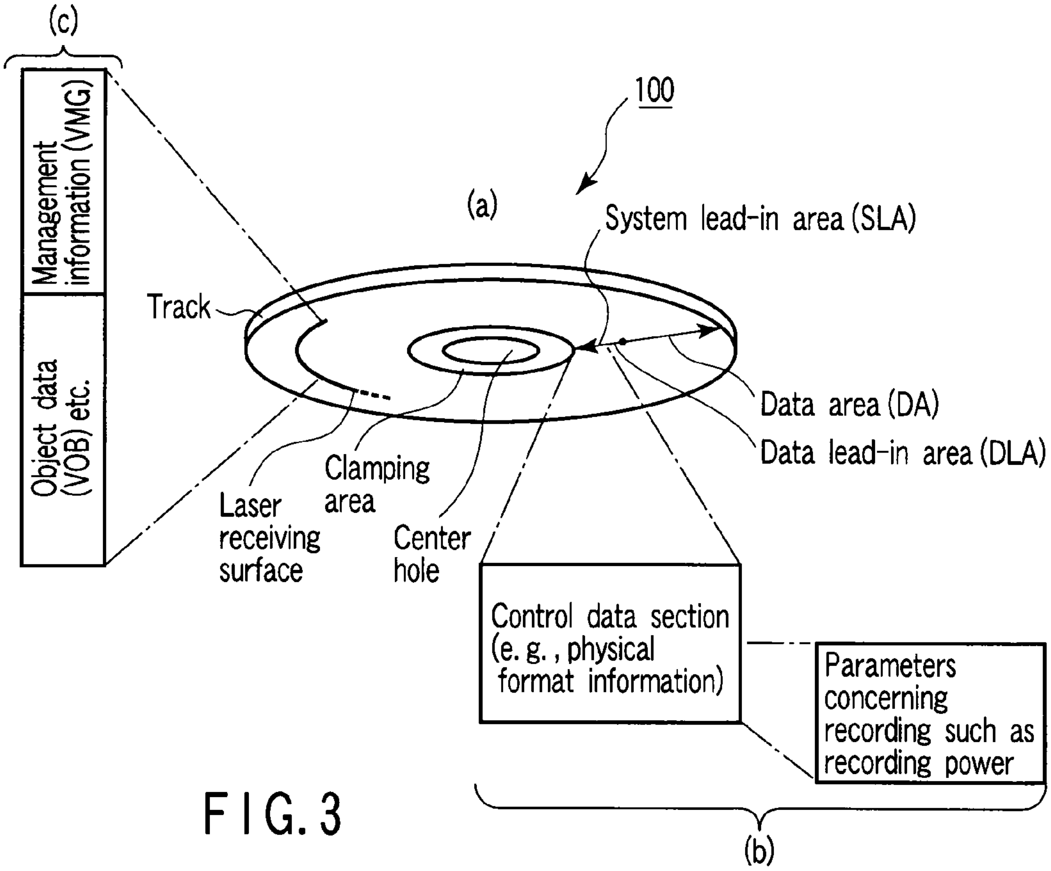
F I G. 3

| | Molecular formula (molecular weight) | λ max (solvent) | Decomposition temperature (heat quantity) |
|---|---|---|---|
| Dye A | $C_{57}H_{59}CoN_{12}O_{10}$ (1131.10) | 577nm ε =1.0×$10^5$ (MeOH) | 286°C (730mJ/mg) |
| Dye B | $C_{38}H_{32}N_{14}NiO_8$ (871.45) | 611nm ε =8.9×$10^4$ (MeOH) | 249°C (336mJ/mg) |
| Dye C | $C_{55}H_{61}CoN_{10}O_8$ (1049.08) | 542nm ε =1.6×$10^5$ (MeOH) | 259°C (795mJ/mg) |
| Dye D | $C_{57}H_{57}CoN_{12}O_{10}$ (1129.07) | 447nm ε =6.9×$10^4$ (MeOH) | 269°C (474mJ/mg) |

FIG. 4

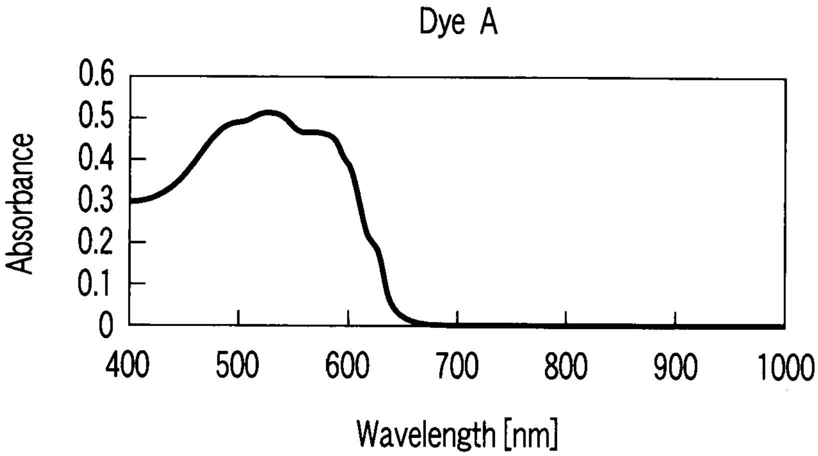
F I G. 5A
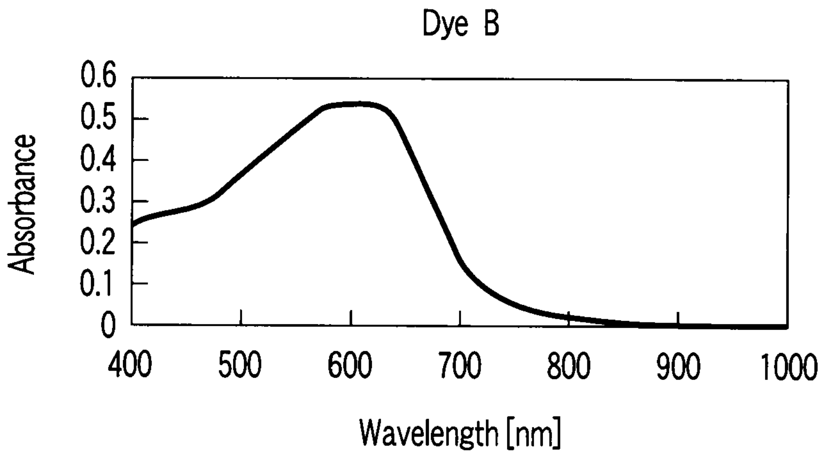
F I G. 5B
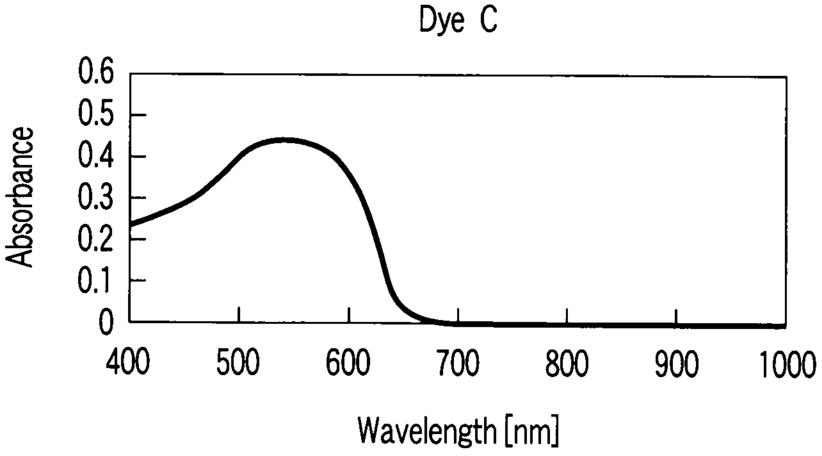
F I G. 5C

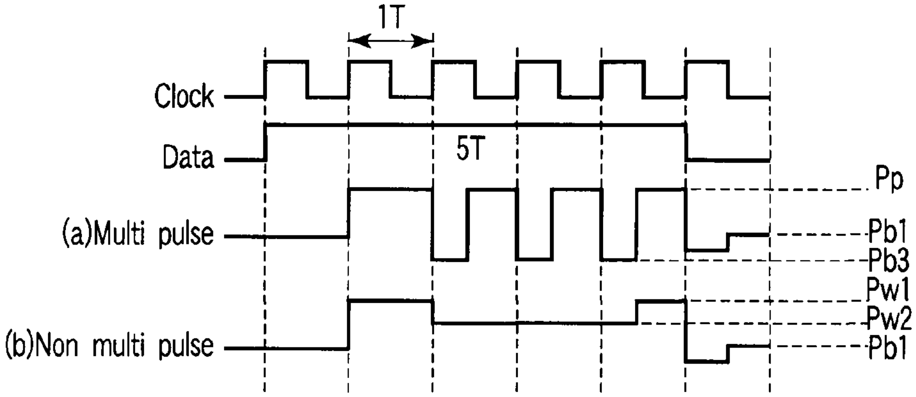
F I G. 8
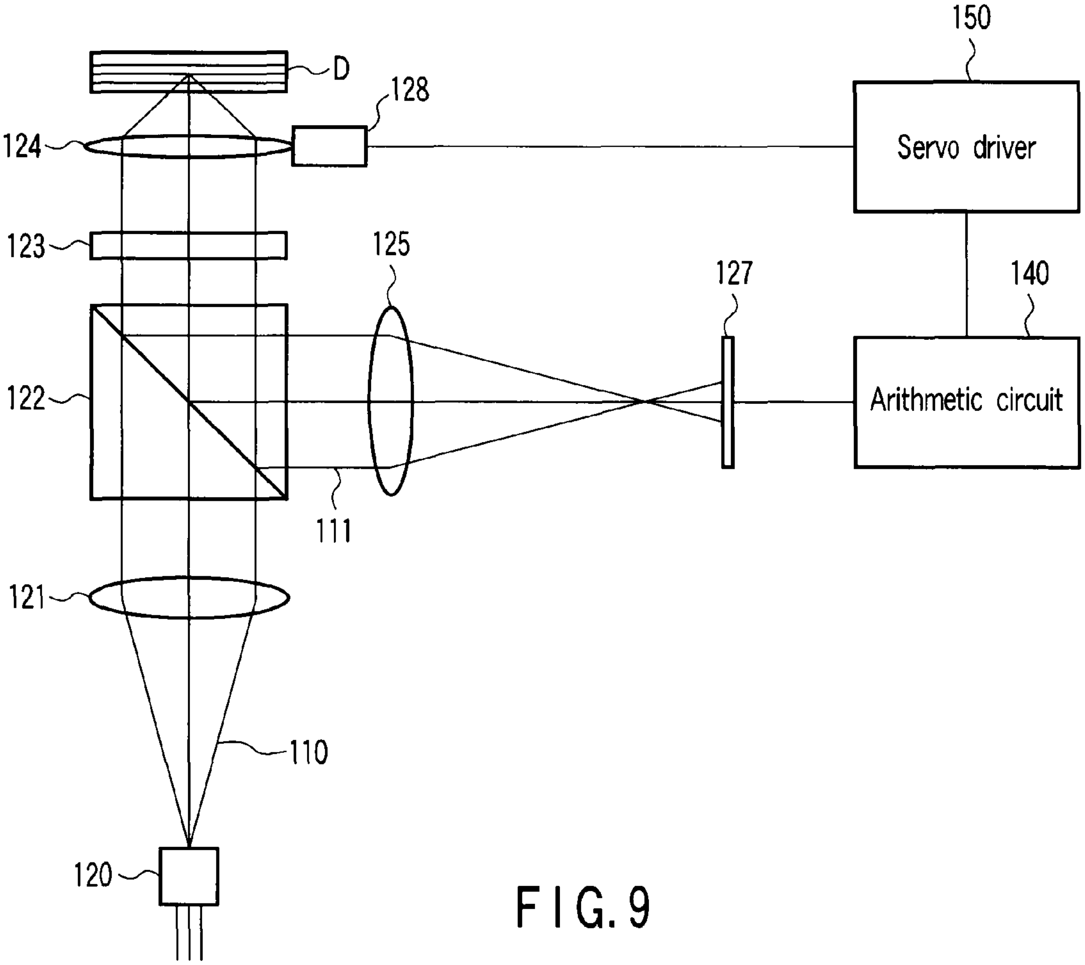
F I G. 9

OPTICAL RECORDING MEDIUM CAPABLE OF USING WIDE RANGES OF LINEAR VELOCITY RECORDING

CROSS-REFERENCE TO RELATED APPLICATIONS

This application is based upon and claims the benefit of priority from Japanese Patent Application No. 2007-249664, filed Sep. 26, 2007, the entire contents of which are incorporated herein by reference.

BACKGROUND

1. Field

One embodiment of the present invention relates to an information recording medium capable of recording and reproducing information by using a short-wavelength laser beam such as a blue laser beam and, more particularly, to a write-once information recording medium.

The present invention relates to an information recording medium capable of recording information in multiple layers, and a disk apparatus using the medium.

2. Description of the Related Art

Optical disks are roughly classified into three types of disks: a ROM disk for playback only, a write-once R disk, and a rewritable RW or RAM disk. As the volume of information increases, demands have arisen to increase the capacity and transfer rate of optical disks. The commercially available optical disks are CDs, DVDs, and the like. To meet the market demand for shortening the recording time of a recordable optical disk, the transfer rate of, e.g., a CD-R has been increased to 48×, and that of, e.g., a DVD-R has been increased to 16×.

To further increase the capacity of an optical disk, an optical disk called an HD DVD has been developed. The data capacity of one side of an HD DVD-ROM or HD DVD-R is 15 GB that is three times or more the data capacity of the conventional DVD, i.e., 4.7 GB. An organic dye material is used in a recording layer of this HD DVD-R as described in, e.g., Jpn. Pat. Appln. KOKAI Publication No. 2005-271587.

Presently, this HD DVD-R is capable of recording at only a standard velocity, but a demand has arisen to increase the transfer rate of the HD DVD-R as well.

If data is recorded at, e.g., 4× on the HD DVD-R disk capable of standard-velocity recording, the recording signal characteristics significantly deteriorate. That is, the present recording layer characteristics make high-linear-velocity recording difficult.

As disclosed in Jpn. Pat. Appln. KOKAI Publication No. 2006-134518, the DVD-R can satisfy the recording characteristics over a broad recording linear velocity range. However, while the DVD-R performs H-to-L (High-to-Low) recording by which the reflectance after recording is lower than that before recording, the HD DVD-R using a dye material performs L-to-H (Low-to-High) recording by which the reflectance after recording is higher than that before recording. The recording mechanisms of the DVD-R and HD DVD-R are also different. This makes it difficult to perform recording over a wide recording linear velocity range by using the method disclosed in the Jpn. Pat. Appln. KOKAI Publication No. 2006-134518.

BRIEF SUMMARY OF THE INVENTION

The present invention relates to an information recording medium capable of recording information in multiple layers, and a disk apparatus using the medium.

A general architecture that implements the various feature of the invention will now be described with reference to the drawings. The drawings and the associated descriptions are provided to illustrate embodiments of the invention and not to limit the scope of the invention.

FIG. 1 is a graph showing the relationship between the ratio of the modulation degree at 1× to that at 4× and the PRSNR;

FIG. 2 is a view for explaining an example of the arrangement of an optical disk according to an embodiment of the present invention;

FIG. 3 is a view for explaining an example of the configuration of a physical format according to the embodiment of the present invention;

FIG. 4 is a view showing examples of an organic dye material usable as an L-to-H organic dye layer;

FIGS. 5A to 5C are graphs each showing the relationship between the laser beam wavelength and absorbance of a predetermined dye;

FIG. 8 is a timing chart showing a method of recording data on a write-once information recording medium at 2× or more; and FIG. 9 is a block diagram showing an outline of the arrangement of an optical disk apparatus for playing back an optical disk.

DETAILED DESCRIPTION

Figure 6A:
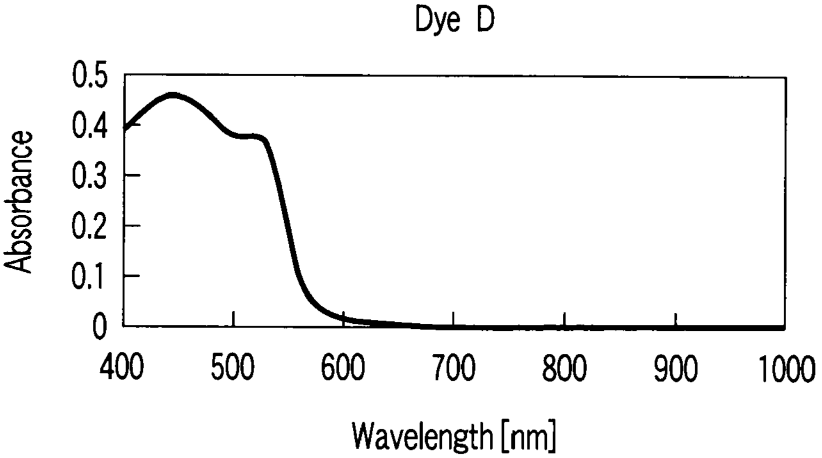
FIGS. 6A and 6B are graphs each showing the relationship between the laser beam wavelength and absorbance of a predetermined dye.

Various embodiments according to the invention will be described hereinafter with reference to the accompanying drawings. In general, according to one embodiment of the invention, an information recording medium is provided, the information recording medium comprises at least a transparent resin substrate having concentric grooves and concentric lands or a spiral groove and spiral land, and a recording layer formed on the groove and land of the transparent resin substrate, and configured to record and reproduce information by using a semiconductor laser of not more than 450 nm, and when reproducing information recorded on the information recording medium, a modulation degree M4× corresponding to 4× recording and a modulation degree M1× corresponding to 1× recording satisfies $$0.87 \leqq M4\times/M1\times \leqq 1.05 \quad (1)$$

The present inventors made extensive studies to solve the above problems, and have found that when using a dye having a recording mechanism by which the dye thermally decomposes and causes a large physical change as in the DVD-R upon recording or reproduction, the modulation degree increases at a high linear velocity, and this increases the influence on adjacent tracks, whereas a dye used in the HD DVD-R decreases the modulation degree at a high linear velocity compared to that at a standard velocity. That is, the present inventors have found that when using a recording layer containing a dye material that decreases the difference between the modulation degrees at a standard velocity and high linear velocity, it is possible to obtain favorable recording characteristics not only at a standard velocity but also at a high linear velocity.

The present inventors made extensive studies to solve the above problems, and have found that when using a dye having a recording mechanism by which the dye thermally decomposes and causes a large physical change as in the DVD-R upon recording or reproduction, the modulation degree increases at a high linear velocity, and this increases the influence on adjacent tracks, whereas a dye used in the HD DVD-R decreases the modulation degree at a high linear velocity compared to that at a standard velocity. That is, the present inventors have found that when using a recording layer containing a dye material that decreases the difference between the modulation degrees at a standard velocity and high linear velocity, it is possible to obtain favorable recording characteristics not only at a standard velocity but also at a high linear velocity.

The reason why the modulation degree decreases at a high linear velocity is probably as follows.

When recording is performed at a high linear velocity, it is difficult to maintain a radial temperature distribution required to obtain the same modulation degree and recording characteristics as those obtained at a standard velocity. When the mark width is increased, the temperature in the track center rises too much. Since this causes the physical changes of the substrate and the like, the recording characteristics worsen. On the other hand, when the temperature in the track center is made equal to that at a standard velocity, the spread of heat narrows at a high linear velocity, and this decreases the mark width and modulation degree. Since, however, the physical changes of the substrate and the like hardly occur, good recording characteristics are readily maintained.

If the modulation degree becomes too small, however, the signal quality deteriorates, so the recording characteristics often worsen.

The present inventors made an examination of various dyes. The results are shown in FIG. 1.

FIG. 1 is a graph showing the relationship between the ratio (M4×/M1×) of the modulation degree at 1× to that at 4× and the PRSNR at 1× and 4×. Referring to FIG. 1, each rhomb indicates 1×, and each square indicates 4×. All the rhombs and squares reflect the experimental results.

The modulation degrees M4× and M1× shown in FIG. 1 are each defined as a value obtained by dividing the amplitude of an RF signal (full addition signal) by the reflectance. More specifically, the modulation degrees M4× and M1× are each represented by RF signal amplitude (the difference between High and Low levels)/High level (the reflectance).

Referring to FIG. 1, a dotted line is drawn in a position where the PRSNR (Partial Response Signal to Noise Ratio) is 15, and normalization is performed such that the PRSNR must be 15 or more in order to maintain good recording characteristics. That is, the ratio (M4×/M1×) of the modulation degree at 1× to that at 4× must be 0.87 or more. The experimental results also reveal that the upper limit of the PRSNR is desirably 38 or less, and that of the modulation degree ratio (M4×/M1×) is desirably 1.05 or less. This demonstrates that favorable recording characteristics can be obtained up to at least 4× when using an information recording medium having an M4×/M1× ratio of 0.87 to 1.05.

The present invention can maintain good recording characteristics by meeting the above expression.

In the present invention, an organic dye material to be used can be selected so as to meet the above condition and obtain a recording layer having almost no mark distortion.

An organic dye material can be used as the material of a recording layer formed in the information recording medium according to the present invention. Also, an organic metal complex can be used as the organic dye material. It is possible to use, e.g., an azo organic metal complex as this material.

In the information recording medium according to the present invention, an organic dye material is used as the material of the recording layer, and the maximum absorption wavelength of the organic dye before recording exists within the range of −10 to +50 nm from the recording laser wavelength.

When the present inventors measured the UV spectra of the recording layer before and after recording, the maximum absorption wavelength near the recording laser wavelength shifted to the short-wavelength side by a few ten nm after recording. Accordingly, it is favorable to use an organic dye by which the maximum absorption wavelength of the UV spectrum of a dye recording film after recording shifts by 5 to 30 nm to the short-wavelength side from that before recording.

Various embodiments of the present invention will be explained below with reference to the accompanying drawing.

FIG. 2 is a view for explaining the arrangement of a write-once, single-sided, single-layered optical disk 100 as an example of the optical disk according to an embodiment of the present invention.

As shown in FIG. 2, the optical disk 100 has a disk-like transparent resin substrate 10 made of a synthetic resin material such as polycarbonate (PC). The transparent resin substrate 10 has concentric grooves or a spiral groove. The transparent resin substrate 10 can be manufactured by injection molding by using a stamper.

A recording layer 11 including an organic dye layer 12 and a light-reflecting layer 14 made of silver or a silver alloy is stacked on the 0.60-mm thick transparent resin substrate 10 made of polycarbonate or the like, and a 0.60-mm thick transparent resin substrate 18 is laminated on the transparent resin substrate 10 with a UV-curing resin (adhesive layer) 16 interposed between them. The total thickness of the laminated optical disk thus obtained is about 1.2 mm.

A spiral groove having, e.g., a track pitch of 0.4 μm and a depth of 60 nm is formed on the transparent resin substrate 10. This groove wobbles, and address information is recorded on the wobble.

The recording layer 12 containing an organic dye is formed on the transparent resin substrate 10 so as to fill the groove.

As the organic dye forming the recording layer 12, it is possible to use an organic dye having a maximum absorption wavelength region shifted to wavelengths longer than the recording wavelength (e.g., 405 nm). Also, the organic dye is designed so as not to extinguish absorption in the recording wavelength region but to have considerable light absorption in the long-wavelength region (e.g., 450 to 600 nm).

When dissolved in a solvent, the organic dye can be easily applied in the form of a liquid onto the surface of the transparent resin substrate by spin coating. In this case, the film thickness can be accurately controlled by controlling the ratio of dilution by the solvent and the rotational speed of spin coating.

Note that the light reflectance of the recording layer 11 herein used is low when focusing or tracking is performed on tracks by the recording laser beam before information is recorded. After that, the light reflectance of a recording mark portion rises because the laser beam causes a certain optical change of the dye and the light absorbance decreases. This achieves a so-called, Low-to-High (or L-to-H) characteristic by which the light reflectance of a recording mark portion formed by emitting the laser beam is higher than that before the laser beam is emitted.

Note that heat generated by the emission of the recording laser sometimes deforms the transparent resin substrate 10, particularly, the groove bottom portion. This deformation may produce a phase difference (when compared to the case where no thermal deformation occurs) in the laser reflected light during reproduction after recording.

In the embodiment of the present invention, a physical format applied to the transparent resin substrate 10 is as follows. The recording capacity usable by the user is 15 GB.

In the optical disk 100 indicated by (a) in FIG. 3, a system lead-in area SLA includes a control data section as indicated by (b) in FIG. 3. This control data section includes parameters concerning recording, such as the recording power (peak power), as a part of physical format information and the like. The system lead-in area SLA is preformed on the transparent resin substrate 10.

Also, mark/space recording is performed on tracks in a data area DA of the optical disk 100 by a laser having a predetermined recording power (peak power) and bias power. As indicated by (c) in FIG. 3, this mark/space recording records object data (e.g., VOB) of a high-resolution TV broadcasting program or the like and management information (VMG) of the object data on the tracks in the data area DA.

As the L-to-H organic dye usable in the embodiment of the present invention, it is possible to use an organic dye including a dye portion and counterion (anion) portion, or an organic metal complex. As the dye portion, it is possible to use, e.g., a cyanine dye, styryl dye, porphyrin dye, or azo dye. A cyanine dye, styryl dye, and azo dye are particularly suitable because the absorptance to the recording wavelength is readily controllable.

When the transparent resin substrate is coated with a thin recording film containing a monomethine cyanine dye having a monomethine chain among the L-to-H organic dyes, the maximum absorption and the absorbance in the recording wavelength region (400 to 405 nm) can be easily adjusted to nearly 0.3 to 0.5, further can be nearly 0.4. This makes it possible to improve the recording/reproduction characteristics, and well design both the light reflectance and recording sensitivity.

The anion portion of the organic dye may be an organic metal complex from the viewpoint of the optical stability as well. An organic metal complex containing cobalt or nickel as its central metal particularly has a high optical stability.

An azo metal complex or the like can be used as the organic metal complex. The azo metal complex has a high solubility when 2,2,3,3-tetrafluoro-1-propanol (TFP) is used as a solvent. This facilitates the preparation of a solution for spin coating. In addition, since the solution can be recycled after spin coating, the manufacturing cost of the information recording medium can be reduced.

Note that the organic metal complex can be dissolved in a TFP solution and applied by spin coating. When used in an information recording medium having two recording layers, the azo metal complex is particularly favorable as the L0 recording layer made of a thin Ag alloy layer because the azo metal complex hardly deforms after recording. Although Cu, Ni, Co, Zn, Fe, Al, Ti, V, Cr, or Y can be used as the central metal, Cu, Ni, and Co especially have a high reproducing light resistance. Cu has no genetic toxicity and improves the quality of recording and reproduction signals.

Various materials can be used as ligands surrounding the central metal. Examples are dyes represented by formulas (D1) to (D6) below. It is also possible to form another structure by combining these ligands.

In addition, the central metal need not be one metal, and it is also possible to use a plurality of central metals, i.e., form the structure of a so-called dinuclear complex. In this case, the ratio of the ligands to the central metals depends upon the coordinate number of the central metals and the sizes and structures of the ligands. Possible examples are 1:1, 1:2, 1:3, 1:4, 2:2, 2:3, 2:4, 2:5, 2:6, 3:3, 3:4, 3:5, 3:6, 3:7, 3:8, 4:4, 4:5, 4:6, 4:7, 4:8, 4:9, and 4:10. C23 is an example. The dinuclear complex improves the quality of recording and reproduction signals over an especially wide recording velocity range. In particular, dyes having ratios of 2:2, 3:3, and 4:4 can be used because they have a high reproduction durability and a wide recording power margin even at a high linear velocity.

(D1)

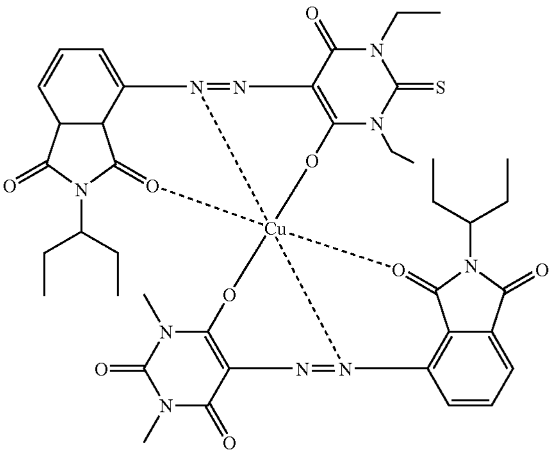

-continued (D2)

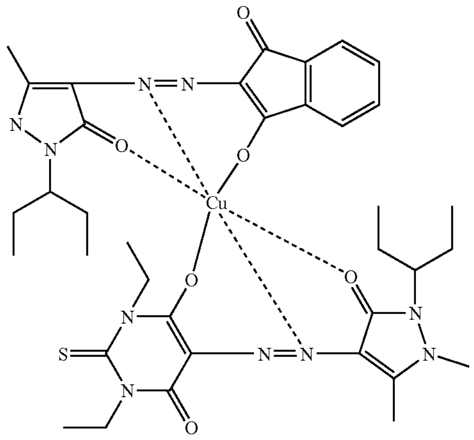

(D3)

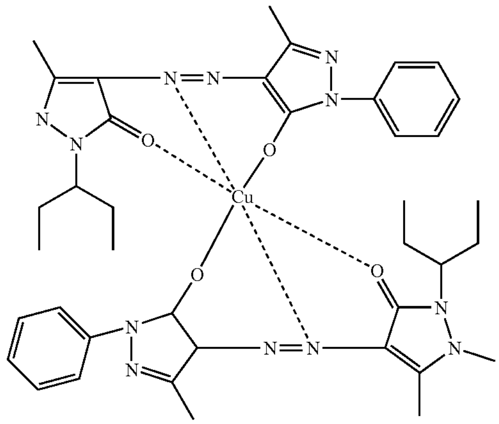

(D4)

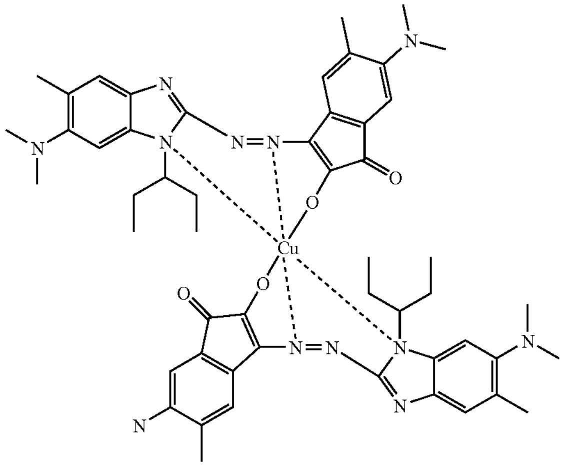

-continued (D5)

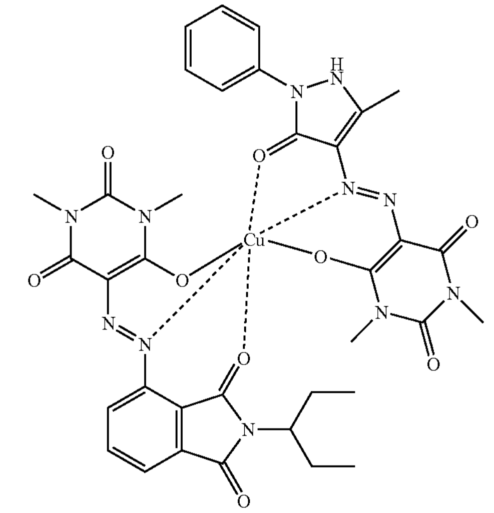

(D6)

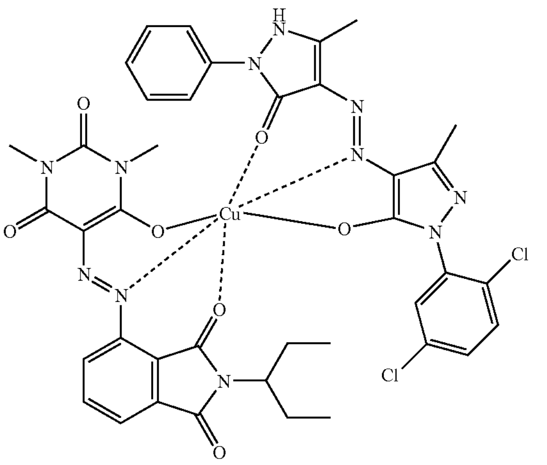

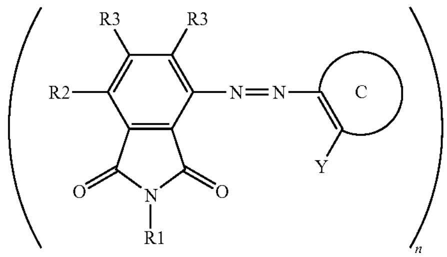

FIG. 4 shows four examples, i.e., dyes A to D as organic dye materials usable as the L-to-H organic dye layer usable in the present invention. The dye A has a styryl dye as a dye portion (cation portion) and azo metal complex 1 as an anion portion. The dye C has a styryl dye as a dye portion (cation portion) and azo metal complex 2 as an anion portion. The dye D has a monomethinecyanine dye as a dye portion (cation portion) and azo metal complex 1 as an anion portion. Note that an organic metal complex can also be used singly. As an example, the dye B is a nickel complex dye.

Formula (E1) below indicates the formula of the styryl dye as the dye portions of the dyes A and C. Formula (E2) below indicates the formula of the azo metal complex as the anion portions of the dyes A and C. Formula (E3) below indicates the formula of the monomethinecyanine dye as the dye portion of the dye D. Formula (E4) below indicates the formula of the azo metal complex as the anion portion of the dye D.

(E1)

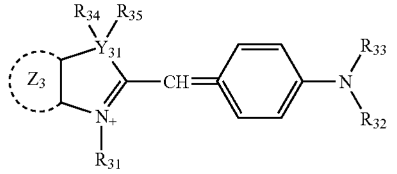

(E2)

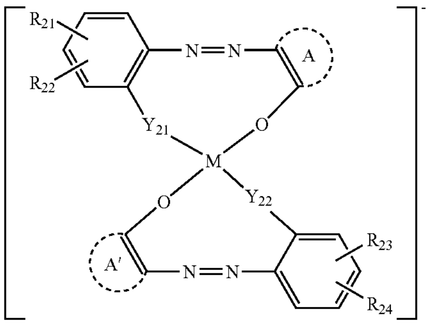

(E3)

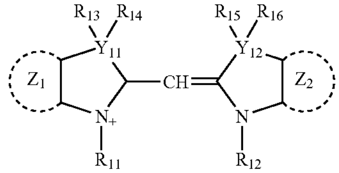

(E4)

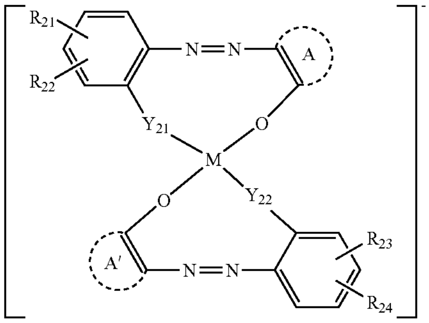

In the formula of the styryl dye, $Z_3$ represents an aromatic ring, and this aromatic ring may have a substituent group. $Y_{31}$ represents a carbon atom or hetero atom. $R_{31}$, $R_{32}$, and $R_{33}$ represent the same aliphatic hydrocarbon group or different aliphatic hydrocarbon groups, and these aliphatic hydrocarbon groups may have a substituent group. $R_{34}$ and $R_{35}$ each independently represent a hydrogen atom or appropriate substituent group. When $Y_{31}$ is a hetero atom, one or both of $R_{34}$ and $R_{35}$ do not exist.

In the formula of the monomethinecyanine dye, $Z_1$ and $Z_2$ represent the same aromatic ring or different aromatic rings, and these aromatic rings may have a substituent group. $Y_{11}$ and $Y_{12}$ each independently represent a carbon atom or hetero atom. $R_{11}$ and $R_{12}$ represent aliphatic hydrocarbon groups, and these aliphatic hydrocarbon groups may have a substituent group. $R_{13}$, $R_{14}$, $R_{15}$, and $R_{16}$ each independently represent a hydrogen atom or appropriate substituent group. When $Y_{11}$ and $Y_{12}$ are hetero atoms, some or all of $R_{13}$, $R_{14}$, $R_{15}$, and $R_{16}$ do not exist.

Examples of the monomethinecyanine dye used in this embodiment are dyes obtained by bonding identical or different cyclic nuclei which may have one or a plurality of substituent groups to the two ends of a monomethine chain which may have one or a plurality of substituent groups. Examples of the cyclic nuclei are an imidazoline ring, imidazole ring, benzoimidazole ring, α-naphthoimidazole ring, β-naphthoimidazole ring, indole ring, isoindole ring, indolenine ring, isoindolenine ring, benzoindolenine ring, pyridinoindolenine ring, oxazoline ring, oxazole ring, isoxazole ring, benzoxazole ring, pyridinoxazole ring, α-naphthoxazole ring, β-naphthoxazole ring, selenazoline ring, selenazole ring, benzoselenazole ring, α-naphthoselenazole ring, β-naphthoselenazole ring, thiazoline ring, thiazole ring, isothiazole ring, benzothiazole ring, α-naphthothiazole ring, β-naphthothiazole ring, tellurazoline ring, tellurazole ring, benzotellurazole ring, α-naphthotellurazole ring, β-naphthotellurazole ring, acridine ring, anthracene ring, isoquinoline ring, isopyrrole ring, imidanoxaline ring, indandione ring, indazole ring, indaline ring, oxadiazole ring, carbazole ring, xanthene ring, quinazoline ring, quinoxaline ring, quinoline ring, chroman ring, cyclohexanedione ring, cyclopentanedione ring, cinnoline ring, thiodiazole ring, thioxazolidone ring, thiophene ring, thionaphthene ring, thiobarbituric acid ring, thiohydantoin ring, tetrazole ring, triazine ring, naphthalene ring, naphthyridine ring, piperazine ring, pyrazine ring, pyrazole ring, pyrazoline ring, pyrazolidine ring, pyrazolone ring, pyran ring, pyridine ring, pyridazine ring, pyrimidine ring, pyrylium ring, pyrrolidine ring, pyrroline ring, pyrrole ring, phenazine ring, phenanthrizine ring, phenanthrene ring, phenanthroline ring, phtharazine ring, puterizine ring, furazane ring, furan ring, purine ring, benzene ring, benzoxazine ring, benzopyran ring, morpholine ring, and rhodanine ring.

In the formulas of the monomethinecyanine dye and styryl dye, $Z_1$ to $Z_3$ represent aromatic rings such as a benzene ring, naphthalene ring, pyridine ring, quinoline ring, and quinoxaline ring, and these aromatic rings may have one or a plurality of substituent groups. Examples of the substituent groups are aliphatic hydrocarbon groups such as a methyl group, trifluoromethyl group, ethyl group, propyl group, isopropyl group, butyl group, isobutyl group, sec-butyl group, tert-butyl group, pentyl group, isopentyl group, neopentyl group, tert-pentyl group, 1-methylpentyl group, 2-methylpentyl group, hexyl group, isohexyl group, 5-methylhexyl group, heptyl group, and octyl group; alicyclic hydrocarbon groups such as a cyclopropyl group, cyclobutyl group, cyclopentyl group, and cyclohexyl group; aromatic hydrocarbon groups such as a phenyl group, biphenylyl group, o-tolyl group, m-tolyl group, p-tolyl group, xylyl group, mesityl group, o-cumenyl group, m-cumenyl group, and p-cumenyl group; ether groups such as a methoxy group, trifluoromethoxy group, ethoxy group, propoxy group, isopropoxy group, butoxy group, sec-butoxy group, tert-butoxy group, pentyloxy group, phenoxy group, and benzoyloxy group; ester groups such as a methoxycarbonyl group, trifluoromethoxycarbonyl group, ethoxycarbonyl group, propoxycarbonyl group, acetoxy group, and benzoyloxy group; halogen groups such as a fluoro group, chloro group, bromo group, and iodo group; thio groups such as a methylthio group, ethylthio group, propylthio group, butylthio group, and phenylthio group; sulfamoyl groups such as a methylsulfamoyl group, dimethylsulfamoyl group, ethylsulfamoyl group, diethylsulfamoyl group, propylsulfamoyl group, dipropylsulfamoyl group, butylsulfamoyl group, and dibutylsulfamoyl group; amino groups such as a primary amino group, methylamino group, dimethylamino group, ethylamino group, diethylamino group, propylamino group, dipropylamino group, isopropylamino group, diisopropylamino group, butylamino group, dibutylamino group, and piperidino group; carbamoyl groups such as a methylcarbamoyl group, dimethylcarbamoyl group, ethylcarbamoyl group, diethylcarbamoyl group, propylcarbamoyl group, and dipropylcarbamoyl group; and a hydroxy group, carboxy group, cyano group, nitro group, sulfino group, sulfo group, and mesyl group. Note that in these formulas, $Z_1$ and $Z_2$ can be the same or different.

In the formulas of the monomethinecyanine dye and styryl dye, $Y_{11}$, $Y_{12}$, and $Y_{31}$ each represent a carbon atom or hetero atom. Examples of the hetero atom are group-XV and group-XVI atoms in the periodic table, such as a nitrogen atom, oxygen atom, sulfur atom, selenium atom, and tellurium atom. Note that the carbon atom represented by $Y_{11}$, $Y_{12}$, or $Y_{31}$ may also be an atomic group mainly containing two carbon atoms, such as an ethylene group or vinylene group. Note also that $Y_{11}$ and $Y_{12}$ in the formula of the monomethinecyanine dye can be the same or different.

In the formulas of the monomethinecyanine dye and styryl dye, $R_{11}$, $R_{12}$, $R_{13}$, $R_{32}$, and $R_{33}$ each represent an aliphatic hydrocarbon group. Examples of the aliphatic hydrocarbon group are a methyl group, ethyl group, propyl group, isopropyl group, isopropenyl group, 1-propenyl group, 2-propenyl group, butyl group, isobutyl group, sec-butyl group, tert-butyl group, 2-butenyl group, 1,3-butadienyl group, pentyl group, isopentyl group, neopentyl group, tert-pentyl group, 1-methylpentyl group, 2-methylpentyl group, 2-pentenyl group, hexyl group, isohexyl group, 5-methylhexyl group, heptyl group, and octyl group. This aliphatic hydrocarbon group may have one or a plurality of substituent groups similar to those of $Z_1$ to $Z_3$.

Note that $R_{11}$ and $R_{12}$ in the formula of the monomethinecyanine dye can be the same or different, and $R_{13}$, $R_{32}$, and $R_{33}$ in the formula of the styryl dye can be the same or different.

$R_{13}$ to $R_{16}$, $R_{34}$, and $R_{35}$ in the formulas of the monomethinecyanine dye and styryl dye each independently represent a hydrogen atom or appropriate substituent group in the individual formulas. Examples of the substituent group are aliphatic hydrocarbon groups such as a methyl group, trifluoromethyl group, ethyl group, propyl group, isopropyl group, butyl group, isobutyl group, sec-butyl group, tert-butyl group, pentyl group, isopentyl group, neopentyl group, tert-pentyl group, 1-methylpentyl group, 2-methylpentyl group, hexyl group, isohexyl group, 5-methylhexyl group, heptyl group, and octyl group; ether groups such as a methoxy group, trifluoromethoxy group, ethoxy group, propoxy group, butoxy group, tert-butoxy group, pentyloxy group, phenoxy group, and benzoyloxy group; halogen groups such as a fluoro group, chloro group, bromo group, and iodo group; and a hydroxy group, carboxy group, cyano group, and nitro group. Note that when $Y_{11}$, $Y_{12}$, and $Y_{31}$ are hetero atoms in the formulas of the monomethinecyanine dye and styryl dye, some or all of $R_{13}$ to $R_{16}$ in $Z_1$ and $Z_2$ and one or both of $R_{34}$ and $R_{35}$ in $Z_3$ do not exist.

In the formula of the azo metal complex, A and A' represent 5- to 10-membered heterocyclic groups which are the same or different and each contain one or a plurality of hetero atoms selected from a nitrogen atom, oxygen atom, sulfur atom, selenium atom, and tellurium atom. Examples of the heterocyclic groups are a furyl group, thienyl group, pyrrolyl group, pyridyl group, piperidino group, piperidyl group, quinolyl group, and isoxazolyl group. This heterocyclic group may have one or a plurality of substituent groups. Examples of the substituent groups are aliphatic hydrocarbon groups such as a methyl group, trifluoromethyl group, ethyl group, propyl group, isopropyl group, butyl group, isobutyl group, sec-butyl group, tert-butyl group, pentyl group, isopentyl group, neopentyl group, tert-pentyl group, 1-methylpentyl group, 2-methylpentyl group, hexyl group, isohexyl group, and 5-methylhexyl group; ester groups such as a methoxycarbonyl group, trifluoromethoxycarbonyl group, ethoxycarbonyl group, propoxycarbonyl group, acetoxy group, trifluoroacetoxy group, and benzoyloxy group; aromatic hydrocarbon groups such as a phenyl group, biphenylyl group, o-tolyl group, m-tolyl group, p-tolyl group, o-cumenyl group, m-cumenyl group, p-cumenyl group, xylyl group, mesityl group, styryl group, cinnamoyl group, and naphthyl group; and a carboxy group, hydroxy group, cyano group, and nitro group.

Practical examples of the dye having the dye portion and counterion (anion) portion are as follows.

The dye portion can have structures indicated by F1 to F6 below.

(F1)
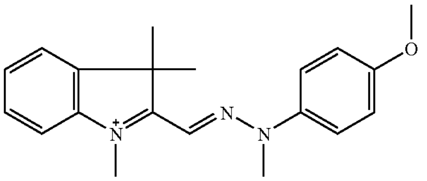
(F2)
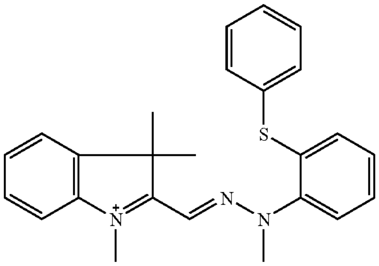
(F3)
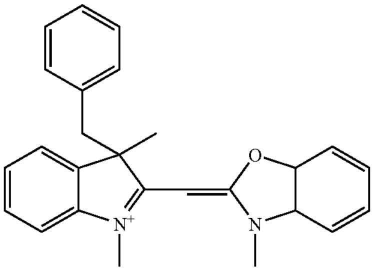
(F4)
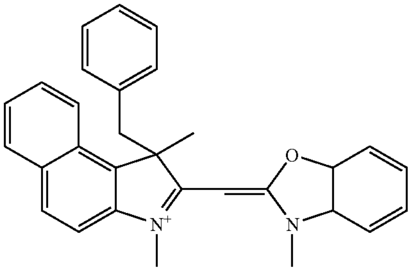
(F5)
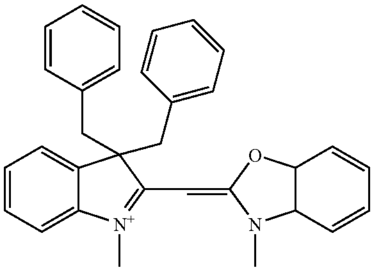
-continued
(F6)
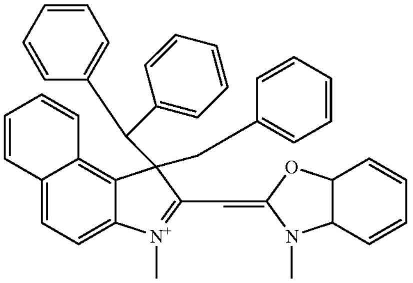
Also, the counterion (anion) portion can have structures indicated by G1 to G6 below. These dye portions and counterion portions can be used as they are appropriately combined.
(G1)
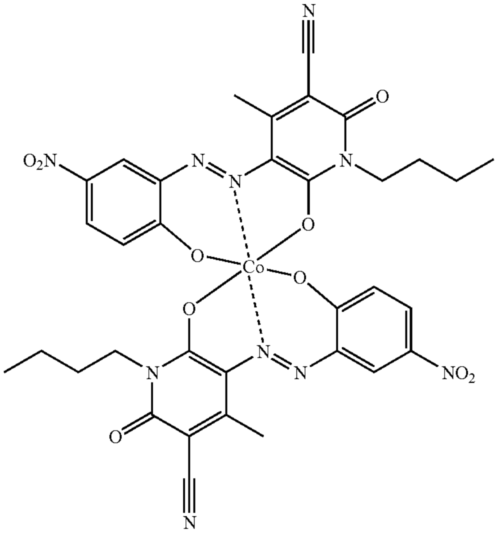
(G2)
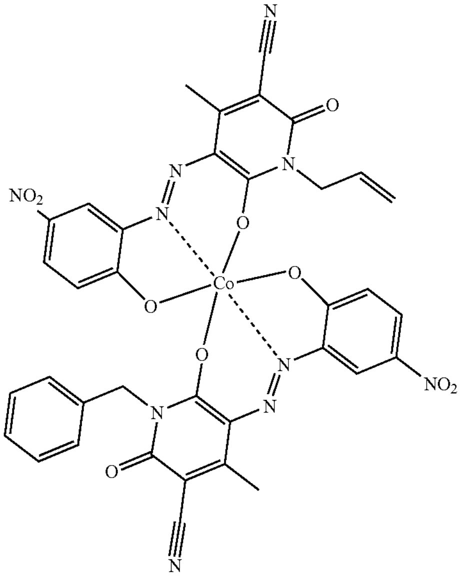

-continued (G3)

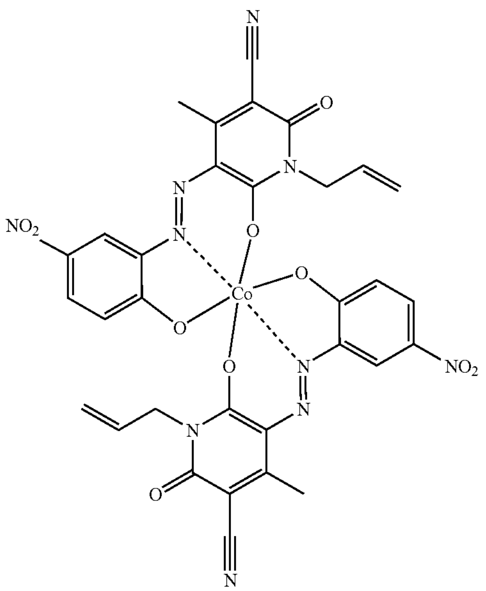

(G4)

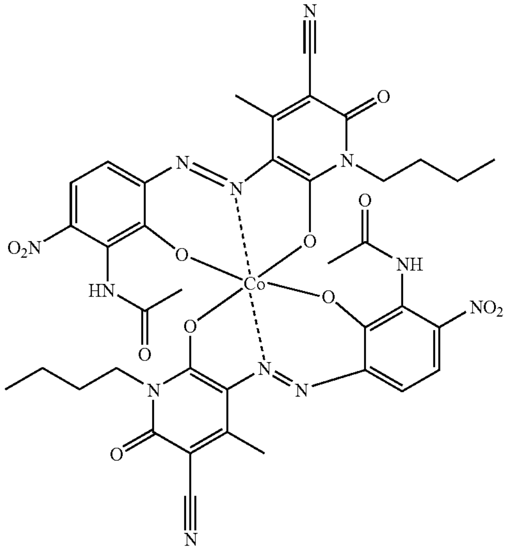

-continued (G5)

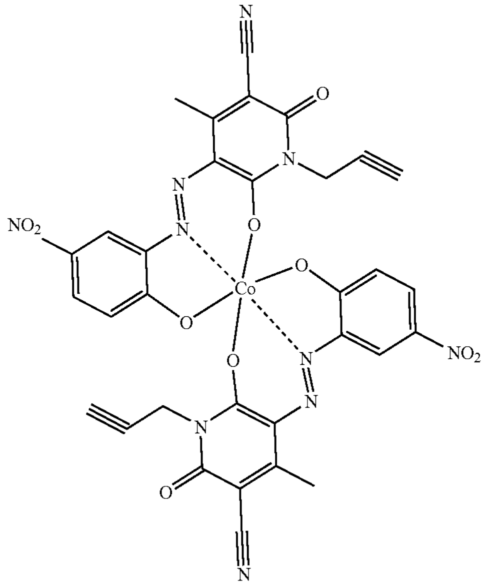

(G6)

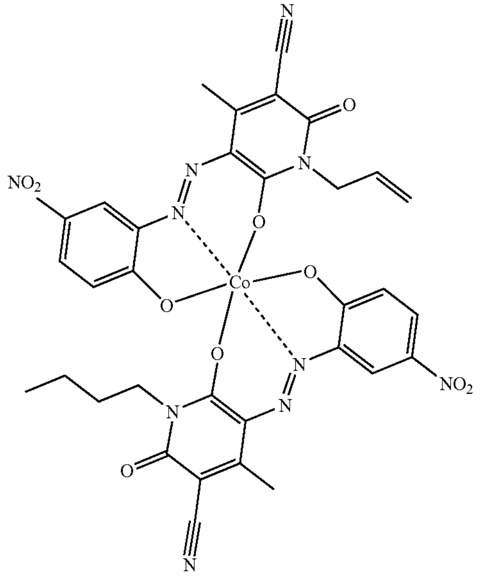

In the formula of the azo metal complex, A and A' represent 5- to 10-membered heterocyclic groups which are the same or different and each contain one or a plurality of hetero atoms selected from a nitrogen atom, oxygen atom, sulfur atom, selenium atom, and tellurium atom. Examples of the heterocyclic groups are a furyl group, thienyl group, pyrrolyl group, pyridyl group, piperidino group, piperidyl group, quinolyl group, and isoxazolyl group. This heterocyclic group may have one or a plurality of substituent groups. Examples of the substituent groups are aliphatic hydrocarbon groups such as a methyl group, trifluoromethyl group, ethyl group, propyl group, isopropyl group, butyl group, isobutyl group, sec-butyl group, tert-butyl group, pentyl group, isopentyl group, neopentyl group, tert-pentyl group, 1-methylpentyl group, 2-methylpentyl group, hexyl group, isohexyl group, and 5-methylhexyl group; ester groups such as a methoxycarbonyl group, trifluoromethoxycarbonyl group, ethoxycarbonyl group, propoxycarbonyl group, acetoxy group, trifluoroacetoxy group, and benzoyloxy group; aromatic hydrocarbon groups such as a phenyl group, biphenylyl group, o-tolyl group, m-tolyl group, p-tolyl group, o-cumenyl group, m-cumenyl group, p-cumenyl group, xylyl group, mesityl group, styryl group, cinnamoyl group, and naphthyl group; and a carboxy group, hydroxy group, cyano group, and nitro group.

Note that an azo compound forming the azo-based organic metal complex represented by the formula can be obtained in accordance with the conventional method by reacting diazonium salt having $R_{21}$ and $R_{22}$ or $R_{23}$ and $R_{24}$ corresponding to the formula with a heterocyclic compound having an active methylene group adjacent to a carbonyl group in the molecule. Examples of the heterocyclic compound are an isoxazolone compound, oxazolone compound, thionaphthene compound, pyrazolone compound, barbituric acid compound, hydantoin compound, and rhodanine compound. $Y_{21}$ and $Y_{22}$ represent hetero atoms which are the same or different and selected from group-XVI elements in the periodic table, e.g., an oxygen atom, sulfur atom, selenium atom, and tellurium atom.

The azo metal complex represented by the formula is normally used in the form of a metal complex in which one or a plurality of azo metal complexes are coordinated around a metal (central atom). Examples of a metal element serving as the central atom are scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, and mercury. According to the embodiment of the present invention, cobalt is particularly usable.

Although the central atom can be one atom, a plurality of central atoms may also form a so-called dinuclear complex. In this case, the ratio of the ligands to the central atoms can be 1:2, 2:2, 2:3, 2:4, 3:3, 3:4, 3:5, 3:6, 4:4, 4:5, 4:6, 4:7, and 4:8.

FIG. 5A shows the change in absorbance of the dye A to the wavelength of an emitted laser beam. FIG. 5B shows the change in absorbance of the dye B to the wavelength of an emitted laser beam. FIG. 5C shows the change in absorbance of the dye C to the wavelength of an emitted laser beam.

Figure 6B:
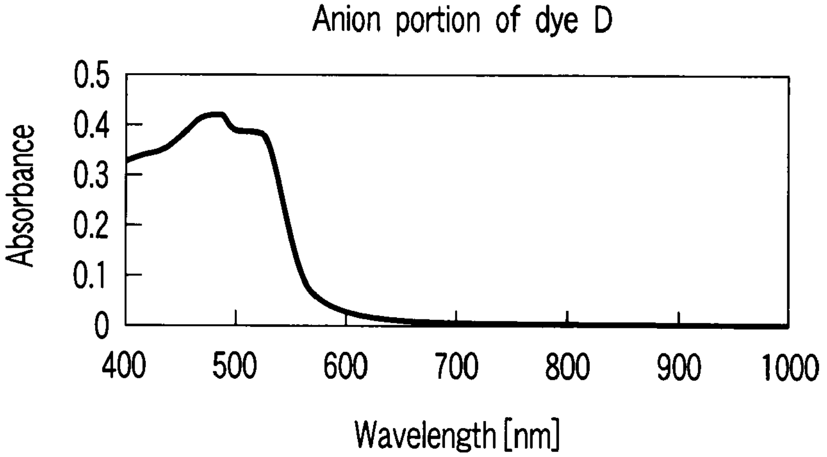

FIG. 6A shows the change in absorbance of the dye D to the wavelength of an emitted laser beam. FIG. 6B shows the change in absorbance of the anion portion of the dye D to the wavelength of an emitted laser beam.

As is evident from the characteristics shown in FIGS. 5A to 6B, the dyes A to D each have a maximum absorption wavelength region shifted to wavelengths longer than the recording wavelength (405 nm). The write-once optical disk explained in this embodiment comprises the recording film containing the organic dye having the characteristics as described above, and is given the so-called L-to-H characteristic by which the light reflectance after laser beam emission is higher than that before laser beam emission. Even when a short-wavelength laser beam such as a blue laser beam is used, therefore, this write-once optical disk is superior in, e.g., storage durability, reproduction signal S/N ratio, and bit error rate, and capable of recording and reproducing information at a high density with performance on a well practical level.

That is, in this write-once optical disk, the maximum absorption wavelength of the recording film containing the organic dye is longer than the wavelength of the recording laser beam. Since this makes it possible to reduce the absorption of short-wavelength light such as ultraviolet radiation, the optical stability and the reliability of information recording/reproduction improve.

Also, since the light reflectance is low when information is recorded, no cross write occurs owing to reflective diffusion. Therefore, even when information is recorded on an adjacent track, it is possible to reduce the deterioration of the reproduction signal S/N ratio and bit error rate. Furthermore, the contrast and resolution of a recording mark can be kept high even against heat. This facilitates recording sensitivity design.

When a dye having a maximum absorption wavelength region shifted to wavelengths shorter than the recording wavelength (405 nm) is used in the recording film, the write-once optical disk explained in this embodiment is given a so-called H-to-L characteristic by which the light reflectance after laser beam emission is lower than that before laser beam emission. Even when a short-wavelength laser beam such as a blue laser beam is used, therefore, this write-once optical disk has a high reflectance, is superior in, e.g., reproduction signal S/N ratio and bit error rate, and is capable of recording and reproducing information at a high density with performance on a well practical level.

That is, in this write-once optical disk, the maximum absorption wavelength of the recording film containing the organic dye is shorter than the wavelength of the recording laser beam. Since this makes it possible to absorb or more or less reflect short-wavelength light such as ultraviolet radiation, the optical stability and the reliability of information recording/reproduction improve.

Furthermore, the contrast and resolution of a recording mark can be kept high even against heat. This facilitates recording sensitivity design.

The azo compound has an aromatic ring, and the recording characteristics, storage characteristics, reproduction stability, and the like can be optimized not only by the structure of the aromatic ring but also by giving various substituent groups to the aromatic ring. As the bulkiness of the substituent group increases, the reproducing light durability increases, but the recording sensitivity decreases. Therefore, it is important to select a substituent group that improves both the characteristics. This substituent group also contributes to the solubility in a solvent.

Unlike the recording mechanism of the conventional dye-based information recording medium (the recording laser wavelength is longer than 620 nm), the recording mechanism of short-wavelength-laser recording (the recording wavelength is, e.g., 405 nm) related to the present invention is not the physical change in volume of the substrate or dye film. Since light absorption exists at the laser recording wavelength, when during reproduction the dye is irradiated with a laser weaker than that used in recording, heat or light gradually changes the orientation of dye molecules in the recording layer, or gradually changes the conformation in the dye molecule. However, the existence of the bulky substituent group in the dye molecule presumably has the effect of preventing easy occurrence of these changes. This is the reason why the bulky substituent group helps increase the reproducing light durability.

The bulky substituent group herein mentioned is a substituent group substituting the aromatic ring in the dye molecule and containing three or more carbon atoms. Examples are an n-propyl group, isopropyl group, n-butyl group, 1-methylpropyl group, 2-methylpropyl group, n-pentyl group, 1-ethylpropyl group, 1-phenylpropyl group, 1-methylbutyl group, 2-methylbutyl group, 3-methylbutyl group, 1,1-dimethylpropyl group, 1,1-diphenylmethyl group, 1,2-dimtehylpropyl group, 2,2-dimethylpropyl group, cyclopentyl group, n-hexyl group, 1-methylpentyl group, 2-methylpentyl group, 3-methylpentyl group, 4-methylpentyl group, 1,1-dimethylbutyl group, 1,2-dimethylbutyl group, 1,3-dimethylbutyl group, 2,2-dimethylbutyl group, 2,3-dimethylbutyl group, 3,3-dimethylbutyl group, 1-ethylbutyl group, 2-ethylbutyl group, cyclohexyl group, and phenyl group. The substituent group may also contain atoms other than carbon. Examples are oxygen, sulfur, nitrogen, silicon, fluorine, bromine, chlorine, and iodine.

Formulas (1) and (2) below indicate two types of formulas of the azo dye used in this embodiment.

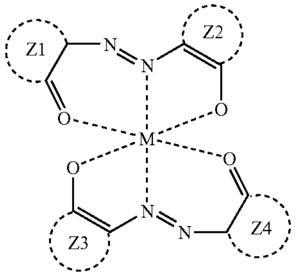

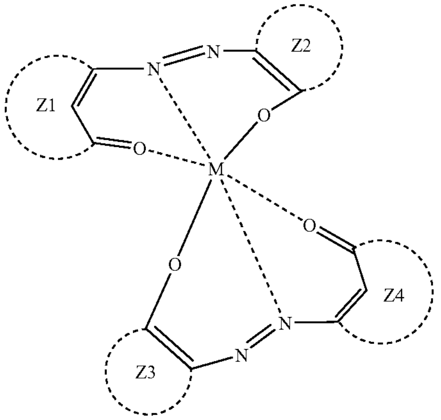

At least one of $Z_1$ to $Z_4$ is an aromatic ring, and the aromatic rings of $Z_1$ to $Z_4$ may be different from each other. This aromatic ring is formed by combining cyclic nuclei, e.g., an imidazoline ring, imidazole ring, benzoimidazole ring, α-naphthoimidazole ring, β-naphthoimidazole ring, indole ring, isoindole ring, indolenine ring, isoindolenine ring, benzoindolenine ring, pyridinoindolenine ring, oxazoline ring, oxazole ring, isoxazole ring, benzoxazole ring, pyridinoxazole ring, α-naphthoxazole ring, β-naphthoxazole ring, selenazoline ring, selenazole ring, benzoselenazole ring, α-naphthoselenazole ring, β-naphthoselenazole ring, thiazoline ring, thiazole ring, isothiazole ring, benzothiazole ring, α-naphthothiazole ring, β-naphthothiazole ring, tellurazoline ring, tellurazole ring, benzotellurazole ring, α-naphthotellurazole ring, β-naphthotellurazole ring, acridine ring, anthracene ring, isoquinoline ring, isopyrrole ring, imidanoxaline ring, indandione ring, indazole ring, indaline ring, oxadiazole ring, carbazole ring, xanthene ring, quinazoline ring, quinoxaline ring, quinoline ring, chroman ring, cyclohexanedione ring, cyclopentanedione ring, cinnoline ring, thiodiazole ring, thioxazolidone ring, thiophene ring, thionaphthene ring, thiobarbituric acid ring, thiohydantoin ring, tetrazole ring, triazine ring, naphthalene ring, naphthyridine ring, barbituric acid ring, piperazine ring, pyrazine ring, pyrazole ring, pyrazoline ring, pyrazolidine ring, pyrazolone ring, pyran ring, pyridine ring, pyridazine ring, pyridone ring, pyrimidine ring, pyrylium ring, pyrrolidine ring, pyrroline ring, pyrrole ring, phenazine ring, phenanthrizine ring, phenanthrene ring, phenanthroline ring, phtharazine ring, puterizine ring, furazane ring, furan ring, purine ring, benzene ring, benzoxazine ring, benzopyran ring, morpholine ring, and rhodanine ring.

In the organic dye having the dye portion (cation portion) and anion portion, a cyanine dye, styryl dye, monomethine cyanine dye, or azo dye can be used as the dye material portion although not shown.

EXAMPLE 1

A transparent resin substrate 120 mm in diameter and 0.6 mm in thickness having concentric grooves and concentric lands or a spiral groove and spiral land on the surface and made of, e.g., polycarbonate was prepared.

A 1.2-wt % 2,2,3,3-tetrafluoro-1-propanol (TFP) solution of an organic dye represented by formula (D1) described previously was prepared.

Subsequently, an organic dye layer was formed on the transparent resin substrate by coating it with the TFP solution by spin coating. The thickness from the groove bottom of the organic dye layer after coating was 60 nm. A 100-nm thick light-reflecting layer made of an Ag alloy was stacked on the obtained organic dye layer by sputtering, thereby obtaining a recording layer in which the organic dye layer and light-reflecting layer were stacked.

In addition, the light-reflecting layer was coated with a UV-curing resin by spin coating, and a transparent resin substrate 18 having a thickness of 0.60 mm was laminated on the UV-curing resin, thereby obtaining a single-sided, single-layered, write-once information recording medium.

The dye represented by formula (D1) was an organic metal complex, and had a maximum absorption wavelength of 423 nm.

A reproduction signal evaluation experiment was conducted by using the information recording medium (single-sided, single-layered R evaluation disk) manufactured as described above.

Figure 7:
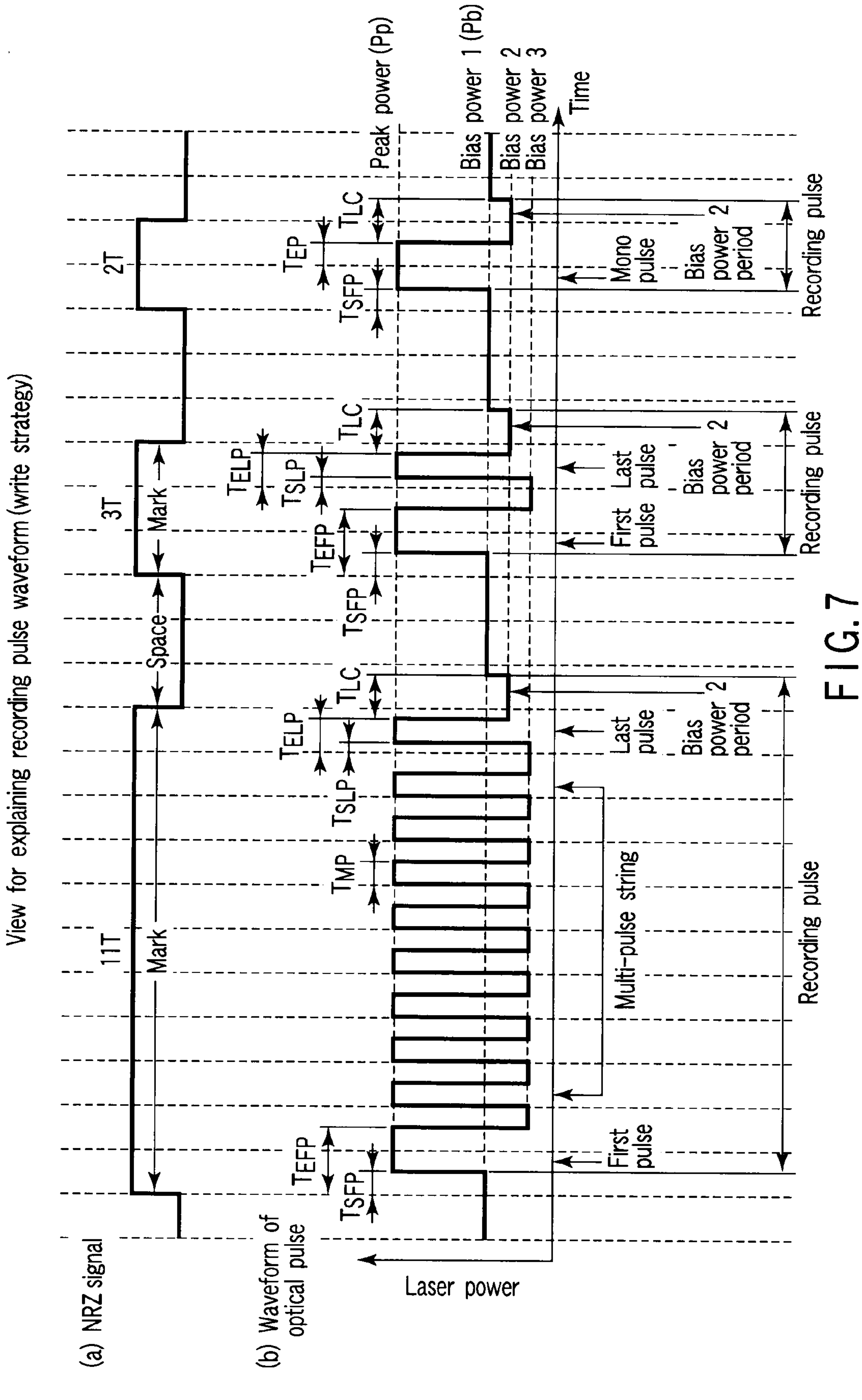
FIG. 7 is a timing chart showing a method of recording rewritable data on a write-once information recording medium.

An apparatus used in the evaluation was the ODU-1000 optical disk evaluation apparatus manufactured by PULSTEC. This apparatus has a laser wavelength of 405 nm and an NA of 0.65. The linear velocity of reproduction was set at 6.61 m/s. Assuming that a reproduction linear velocity of 6.61 m/s was 1×, the recording velocity was set at 6.61 m/s as 1×, and at 26.44 m/s as 4×. A recording signal was 8-12 modulated random data. Information was recorded by using a laser waveform including a recording power (peak power) and two types of bias powers 1 and 2 as shown in FIG. 7. The recording conditions will be described below.

Explanation of Recoding Conditions (Information of Write Strategy)

A recording waveform (exposure conditions during recording) used to check the optimum recording power for a standard velocity and 2× will be explained below with reference to FIG. 7. The recording exposure levels are four levels: a recording power (peak power), bias power 1, bias power 2, and bias power 3. When forming a recording mark 9 having a large length (4T or more), modulation is performed in the form of a multi-pulse between the recording power (peak power) and bias power 3. In this embodiment, the shortest mark length with respect to a channel bit length T is 2T. When recording this 2T shortest mark, as shown in FIG. 7, one write pulse having the recording power (peak power) level is used after bias power 1, and bias power 2 is applied immediately after this write pulse. When recording the recording mark 9 having a length of 3T, two write pulses, i.e., a first pulse and last pulse coming after bias power 1 and having the recording power (peak power) level are exposed, and bias power 2 is once applied after that. When recording the recording mark 9 having a length of 4T or more, bias power 2 is applied after a multi-pulse and last pulse are exposed.

The vertical broken lines in FIG. 7 indicate the channel clock period (T). When recording a shortest mark of 2T, a pulse rises from a position that lags behind the clock edge by TSFP, and falls in a position that lags behind, by TELP, an edge one clock after the leading edge. A period immediately after that during which bias power 2 is applied is defined as TLC. The values of TSFP, TELP, and TLC are recorded in physical format information PFI in a control data zone CDZ.

When forming a long recording mark of 3T or more, a pulse rises from a position that lags behind the clock edge by TSFP, and ends up with a last pulse. Immediately after the last pulse, bias power 2 is applied during a period of TLC. The deviations of the rising and falling timings of the last pulse from the clock edge are respectively defined as TSLP and TELP. Also, the time measured from the clock edge to the falling timing of the first pulse is defined as TEFP, and the interval of one multi-pulse is defined as TMP.

The intervals of TELP-TSFP, TMP, TELP-TSLP, and TLC are defined by half-widths with respect to maximum values. In this embodiment, the setting ranges of the above parameters are $$0.25T \leqq TSFP \leqq 1.50T \quad \text{(eq. 01)}$$

$$0.00T \leqq TELP \leqq 1.00T \quad \text{(eq. 02)}$$

$$1.00T \leqq TELP \leqq 1.75T \quad \text{(eq. 03)}$$

$$-0.10T \leqq TSLP \leqq 1.00T \quad \text{(eq. 04)}$$

$$0.00T \leqq TLC \leqq 1.00T \quad \text{(eq. 05)}$$

$$0.15T \leqq TMP \leqq 0.75T \quad \text{(eq. 06)}$$

Additionally, in this embodiment, the value of each parameter can be changed in accordance with the length (mark length) of a recording mark and the space lengths (leading and trailing space lengths) immediately before and after the mark.

If the multi-pulse write strategy as described above is used when recording information at 2× or more, the clock time shortens as the transfer rate increases, so the pulse width becomes shorter than the total of the laser rising time and falling time when actual emission pulses are observed. This makes a stable accurate laser power difficult to output. Especially when recording information at a high linear velocity, therefore, it is possible to adopt not the multi-pulse recording method but a single-pulse recording method. In this case, a waveform that outputs pulses between the first and last pulses of the multiple pulses described above by power (Pw2) slightly lower than the recording power (Pw1) can be used as the recording strategy. FIG. 8 shows an example. (a) indicates the multi-pulse method used at 1× and 2× described above. (b) indicates a non-multi-pulse method used in high-linear-velocity recording. In this embodiment, the values of parameters such as the rising timing and falling timing of a pulse can be changed in accordance with the length (mark length) of a recording mark and the space lengths (leading and trailing space lengths) immediately before and after the recording mark as in the multi-pulse method (a).

The recording powers were Pp=9.5 mW, Pb1=2.2 mW, Pb2=2.2 mW, and Pb3=1.0 mW at 1×, and Pw1=12.8 mW, Pw2=10.0 mW, Pb1=5.5 mW, and Pb2=5.5 mW at 4×.

When information was recorded at these recording powers, the signal characteristics were that the SbER was $4.2\times10^{-8}$ and the PRSNR was 35.3 at 1×, and the SbER was $1.3\times10^{-5}$ and the PRSNR was 22.1 at 4×, with respect to the target values (the SbER was $5\times10^{-5}$ or less and the PRSNR was 15 or more). That is, it was possible to obtain good recording characteristics from 1× to 4×.

The modulation degree was 0.43 at 1× and 0.41 at 4×, so M4×/M1×=0.95.

1-1× and 1-4× indicate the obtained results in FIG. 1.

EXAMPLE 2

Information was recorded on an information recording medium manufactured following the same procedures as in Example 1 except that a dye (to be referred to as a dye R hereinafter) indicated by $C_{116}H_{76}Cu_4N_{20}O_{20}$ was used. The dye R had a maximum absorption wavelength of 442 nm and a decomposition temperature of 330° C. This dye has the formula of C23.

When recording the information, the recording powers were Pp=8.5 mW, Pb1=2.4 mW, Pb2=2.4 mW, and Pb3=1.0 mW at 1×, and Pw1=17.3 mW, Pw2=15.2 mW, Pb1=4.8 mW, and Pb2=4.8 mW at 4×.

The signal characteristics when the information was recorded at these recording powers were that the SbER was $1.6\times10^{-8}$ and the PRSNR was 19.8 at 1×, and the SbER was $3.7\times10^{-7}$ and the PRSNR was 21.0 at 4×, with respect to the target values (the SbER was $5\times10^{-5}$ or less and the PRSNR was 15 or more). That is, it was possible to obtain more favorable recording characteristics from 1× to 4×.

The modulation degree was 0.41 at 1× and 0.41 at 4×, so M4×/M1×=1.0.

2-1× and 2-4× indicate the obtained results in FIG. 1.

Note that although the modulation degree ratio was 1.0 in Example 2, the modulation degree ratio was 1.05 in another experimental example, so the most desirable value is 1.05 (FIG. 1).

EXAMPLE 3

Information was recorded on information recording media formed following the same procedures as in Example 1 except for dyes. The dyes used were three types of dyes E, F, and G. A table below shows details of the dye structures and results.

TABLE

| | Dye | | | | | |
|---|---|---|---|---|---|---|
| Dye | Anion portion | Cation portion | Pw2/Pw1 | M4x/M1x | 4xPRSNR | 4xSbER |
| E | 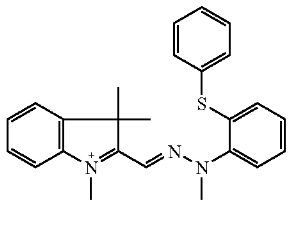 | 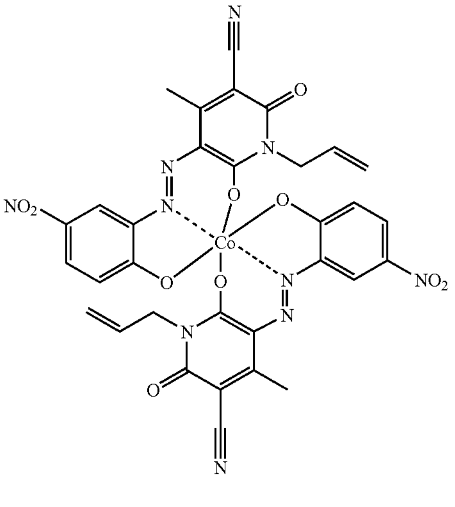 | 0.76 | 0.95 | 25 | 3.4e−5 |

TABLE-continued

| | Dye | | | | | |
|---|---|---|---|---|---|---|
| Dye | Anion portion | Cation portion | Pw2/Pw1 | M4x/M1x | 4xPRSNR | 4xSbER |
| F | 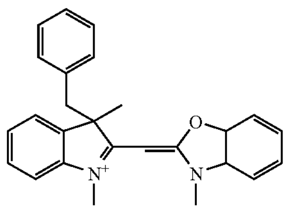 | 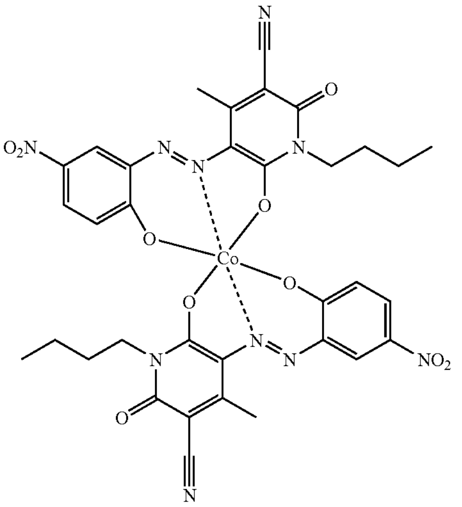 | 0.76 | 0.91 | 22.8 | 2.6e−7 |
| G | 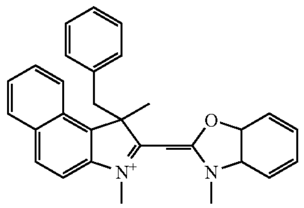 | 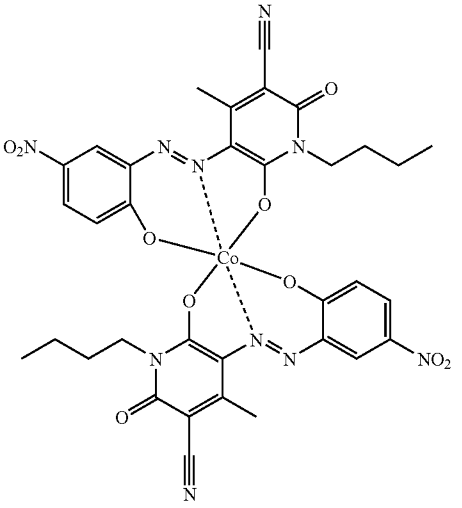 | 0.71 | 0.86 | 9.8 | 2.4e−4 |

In each of the dyes E, F, and G, the anion portion and cation portion were mixed. Of the recording characteristics at 4×, the PRSNR achieved the target value (15 or more) except for the dye G.

3E-1×, 3F-1×, and 3G-1× indicate the obtained results in FIG. 1.

COMPARATIVE EXAMPLE 1

Information was recorded on an information recording medium similar to that of Example 1 by changing the recording power at only 4×. The recording powers at 4× were Pw1=12.8 mW, Pw2=9.0 mW, Pb1=5.5 mW, and Pb2=5.5 mW. The modulation degree was 0.43 at 1× and 0.36 at 4×, so M4×/M1×=0.86. At 4×, the SbER was $6.6\times10^{-5}$, and the PRSNR was 14.2. That is, both the SbER and PRSNR could not achieve the target values (the SbER was $5\times10^{-5}$ or less, and the PRSNR was 15 or more).

1'-1× and 1'-4× indicate the obtained results in FIG. 1.

In this comparative example, the M4×/M1× can be made close to 1 by changing the recording waveform (Pw2 in Comparative Example 1) for use in high-speed recording. Pw2 is effective when it is desirable to make the modulation degree close to that of 1× recording during 4× recording. Pw2/Pw1=0.72 or more is particularly favorable.

COMPARATIVE EXAMPLE 2

Information was recorded on an information recording medium manufactured following the same procedures as in Example 1 except that a dye indicated by the formula of C13 was used.

A dye represented by C24 was made up of the anion portion of an organic metal complex and the cation portion of cyanine, and had a maximum absorption wavelength of 422 nm.

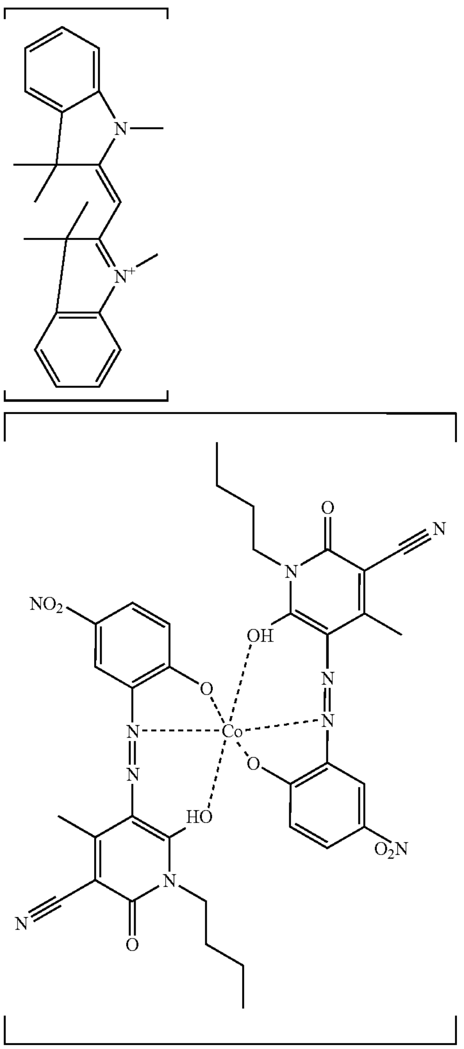

When recording the information, the recording powers were Pp=7.5 mW, Pb1=2.5 mW, Pb2=2.5 mW, and Pb3=1.0 mW at 1×, and Pw1=12.5 mW, Pw2=9.3 mW, Pb1=5.2 mW, and Pb2=5.2 mW at 4×.

The signal characteristics when the information was recorded with these recording powers were that the SbER was $7.0\times10^{-8}$ and the PRSNR was 31.1 at 1×, and the SBER was $2.7\times10^{-4}$ and the PRSNR was 11.7 at 4×. That is, the SbER and PRSNR at 4× were worse than the target values (the SbER was $5\times10^{-5}$ or less, and the PRSNR was 15 or more).

The modulation degree was 0.44 at 1× and 0.38 at 4×, so M4×/M1×=0.86.

2'-1× and 2'-4× indicate the obtained results in FIG. 1.

In the present invention, an information recording medium capable of recording and reproducing information by using a semiconductor laser of 450 nm or less satisfies $$0.87 \leqq M4x/M1x \leqq 1.05 \quad (1)$$

This makes it possible to obtain high-quality recording characteristics over at least a wide recording linear velocity range from 1× to 4×.

An optical disk apparatus for reproducing information recorded on the above-mentioned optical disk will be explained below. FIG. 9 is a block diagram showing an outline of the arrangement of the optical disk apparatus for playing back the optical disk. As shown in FIG. 9, the optical disk is, e.g., a single-sided, double-layered optical disk. A short-wavelength semiconductor laser source 120 is used as the light source. The wavelength of the emitted beam is in, e.g., a violet wavelength band of 400 to 410 nm. An emitted beam 110 from the semiconductor laser source 120 is collimated into a parallel beam by a collimating lens 121, and enters an objective lens 124 through a polarizing beam splitter 122 and λ/4 plate 123. After that, the emitted beam 110 concentrates to each information recording layer through the substrate of an optical disk D. Reflected light 111 from the information recording layer of the optical disk D is transmitted through the substrate of the optical disk D again, and reflected by the polarizing beam splitter 122 through the objective lens 124 and λ/4 plate 123. After that, the reflected light 111 enters a photodetector 127 through a condenser lens 125.

A light-receiving portion of the photodetector 127 is normally divided into a plurality of portions, and each light-receiving portion outputs an electric current corresponding to the light intensity. An I/V amplifier (current-to-voltage converter) (not shown) converts the output electric current into a voltage, and applies the voltage to an arithmetic circuit 140. The arithmetic circuit 140 calculates, e.g., a tilt error signal, HF signal, focusing error signal, and tracking error signal from the input voltage signal. The tilt error signal is used to perform tilt control. The HF signal is used to reproduce information recorded on the optical disk D. The focusing error signal is used to perform focusing control. The tracking error signal is used to perform tracking control.

An actuator 128 can drive the objective lens 124 in the vertical direction, disk radial direction, and tilt direction (the radial direction or/and tangential direction). A servo driver 150 controls the actuator 128 so that the objective lens 124 follows information tracks on the optical disk D. Note that there are two types of tilt directions. One is “a radial tilt” that occurs when the disk surface inclines toward the center of an optical disk. The other is “a tangential tilt” that occurs in the tangential direction of a track. A tilt that generally occurs owing to the warpage of a disk is the radial tilt. It is necessary to take account of not only a tilt that occurs during the manufacture of a disk but also a tilt that occurs owing to deterioration with age or a rapid change in use environment. The optical disk of the present invention can be played back by using the optical disk apparatus like this.

Note that the present invention is not limited to the above embodiments, and can be variously modified without departing from the spirit and scope of the invention when it is practiced at present or in the future on the basis of techniques usable at that point of time. For example, the present invention is also applicable to a future optical disk having three or more recording layers, which will be commercially available in the future, in addition to a single-layered disk and a two-layered disk.

Note also that the individual embodiments may also be appropriately combined as much as possible when practiced. In this case, the combined effects can be obtained. Furthermore, these embodiments include inventions in various stages, so various inventions can be extracted by properly combining a plurality of disclosed constituent elements. For example, even when some of all the constituent elements disclosed in the embodiments are deleted, an arrangement from which these constituent elements are deleted can be extracted as an invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information recording medium having a disc shape comprising a recording layer configured to store information by light, the information being configured to be recorded on the recording layer with a mark and a space, wherein a channel clock period is represented by T, the mark corresponding to 2T or more can be recorded, write parameter information is recorded on a particular area of the information recording medium, the write parameter information includes first information relating to a first peak power value and a first bias power value of a first recording speed, second information relating to a second peak power value and a second bias power value of an increased recording speed which is a quadruple of the first recording speed, the second peak power value can be not less than the first peak power value, the second bias power value can be not less than the first bias power value, when the mark regarding 5T is to be recorded at the first recording speed, a first waveform having four pulses corresponding to the first peak power value is used to record the mark regarding 5T, and when the mark regarding 5T is to be recorded at the increased recording speed, a second waveform having two pulses corresponding to the second peak power value is used to record the mark regarding 5T.

2. A disc apparatus for reproducing information from an information recording medium having a disc shape comprising a recording layer configured to store information by light, the information being configured to be recorded on the recording layer with a mark and a space, wherein a channel clock period is represented by T, the mark corresponding to 2T or more can be recorded, write parameter information is recorded on a particular area of the information recording medium, the write parameter information includes first information relating to a first peak power value and a first bias power value of a first recording speed, second information relating to a second peak power value and a second bias power value of an increased recording speed which is a quadruple of the first recording speed, the second peak power value can be not less than the first peak power value, the second bias power value can be not less than the first bias power value, when the mark regarding 5T is to be recorded at the first recording speed, a first waveform having four pulses corresponding to the first peak power value is used to record the mark regarding 5T, and when the mark regarding 5T is to be recorded at the increased recording speed, a second waveform having two pulses corresponding to the second peak power value is used to record the mark regarding 5T and the apparatus comprising:

a module configured to emit the light to the recording layer; and a module configured to receive the light reflected at the recording.

3. A method of recording information on an information recording medium having a disc shape comprising a recording layer configured to store information by light, the information being configured to be recorded on the recording layer with a mark and a space, wherein a channel clock period is represented by T, the mark corresponding to 2T or more can be recorded, write parameter information is recorded on a particular area of the information recording medium, the write parameter information includes first information relating to a first peak power value and a first bias power value of a first recording speed, second information relating to a second peak power value and a second bias power value of an increased recording speed which is a quadruple of the first recording speed, the second peak power value can be not less than the first peak power value, the second bias power value can be not less than the first bias power value, when the mark regarding 5T is to be recorded at the first recording speed, a first waveform having four pulses corresponding to the first peak power value is used to record the mark regarding 5T, and when the mark regarding 5T is to be recorded at the increased recording speed, a second waveform having two pulses corresponding to the second peak power value is used to record the mark regarding 5T, and the method comprising:

a step of generating the light according to the write parameter information; and a step of recording the information on the recording layer with the generated light.

4. A method of reproducing information from an information recording having a disc shape comprising a a recording layer configured to store information by light, the information being configured to be recorded on the recording layer with a mark and a space, wherein a channel clock period is represented by T, the mark corresponding to 2T or more can be recorded, write parameter information is recorded on a particular area of the information recording medium, the write parameter information includes first information relating to a first peak power value and a first bias power value of a first recording speed, second information relating to a second peak power value and a second bias power value of an increased recording speed which is a quadruple of the first recording speed, the second peak power value can be not less than the first peak power value, the second bias power value can be not less than the first bias power value, when the mark regarding 5T is to be recorded at the first recording speed, a first waveform having four pulses corresponding to the first peak power value is used to record the mark regarding 5T, and when the mark regarding 5T is to be recorded at the increased recording speed, a second waveform having two pulses corresponding to the second peak power value is used to record the mark regarding 5T, and the method comprising:

a step of emitting the light to the recording layer;

a step of receiving the light reflected at the recording layer; and a step of reproducing the information recorded on the recording layer based on the light received by the receiving step.

5. An apparatus for recording information on an information recording medium having a disc shape comprising a a recording layer configured to store information by light, the information being configured to be recorded on the recording layer with a mark and a space, wherein a channel clock period is represented by T, the mark corresponding to 2T or more can be recorded, write parameter information is recorded on a particular area of the information recording medium, the write parameter information includes first information relating to a first peak power value and a first bias power value of a first recording speed, second information relating to a second peak power value and a second bias power value of an increased recording speed which is a quadruple of the first recording speed, the second peak power value can be not less than the first peak power value, the second bias power value can be not less than the first bias power value, when the mark regarding 5T is to be recorded at the first recording speed, a first waveform having four pulses corresponding to the first peak power value is used to record the mark regarding 5T, and when the mark regarding 5T is to be recorded at the increased recording speed, a second waveform having two pulses corresponding to the second peak power value is used to record the mark regarding 5T, and the apparatus comprising:

a module configured to generate the light according to the write parameter information; and to record the information on the recording layer with the generated light.

* * * * *